Patented Mar. 9, 1954

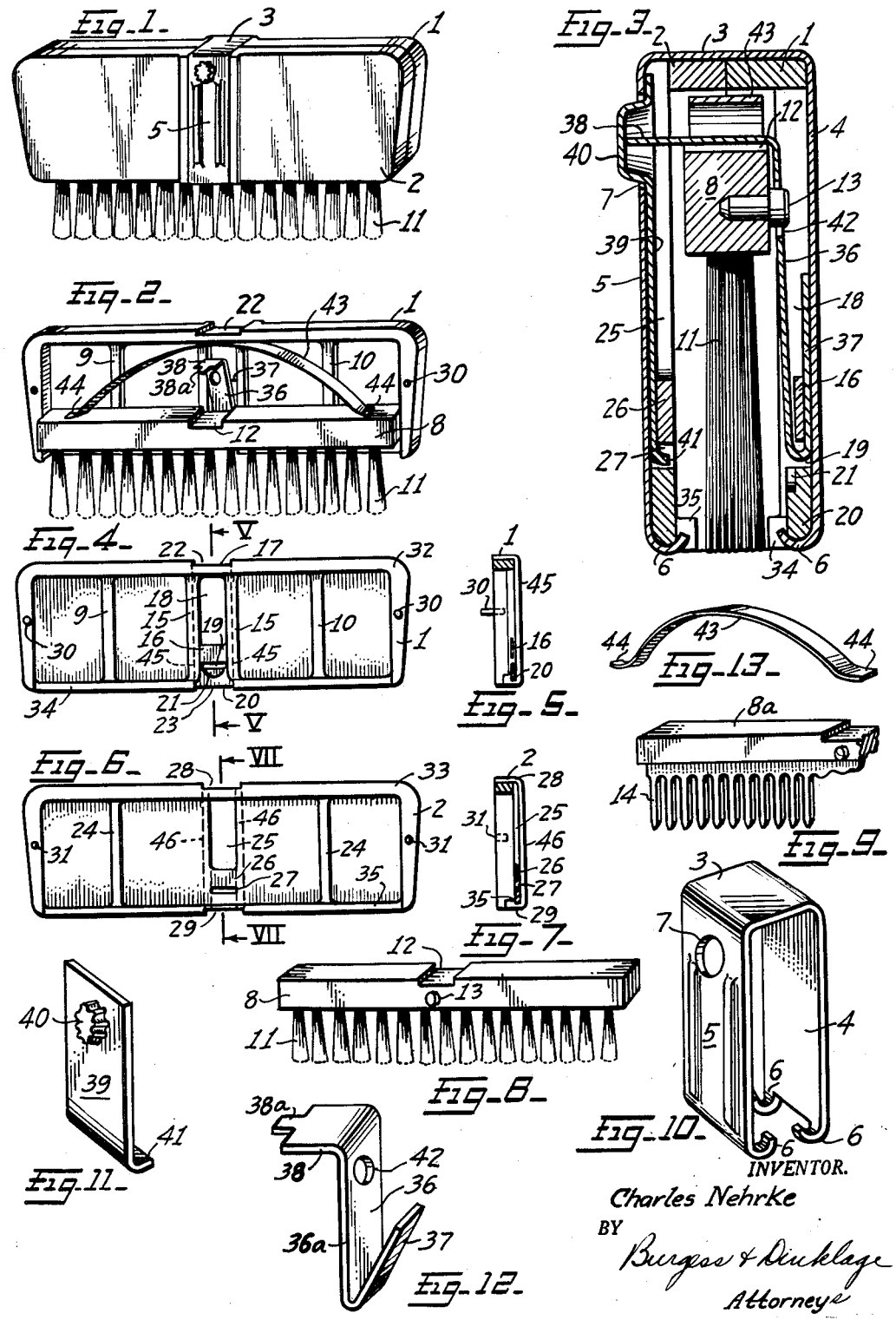

2,671,238

UNITED STATES PATENT OFFICE 2,671,238

POCKET GROOMING IMPLEMENT AND HOUSING THEREFOR

Charles Nehrke, New York, N. Y.

Application October 22, 1949, Serial No. 122,908

9 Claims. (Cl. 15—184)

1

This invention relates to new and useful improvements in pocket grooming implement and housing therefor.

One object of the invention comprises among others a pocket implement which can be conveniently carried on the person of the user as a compact unit.

This and further objects of the invention will be apparent from the following description read in conjunction with the drawings in which:

Fig. 1 is a perspective view of a construction in accordance with the invention;

Fig. 2 is a perspective view of part of a construction shown in Fig. 1;

Fig. 3 illustrates a cross-sectional side view of a construction as exemplified in Figs. 1 and 2;

Fig. 4 shows an inside view of the back portion of an implement housing constructed in accordance with the invention;

Fig. 5 is a cross-sectional side view of the construction shown in Fig. 4 on the plane V—V thereof;

Fig. 6 illustrates an inside view of a front portion of the implement housing in accordance with the invention;

Fig. 7 is a cross-sectional side view of the construction shown in Fig. 6 on the plane VII—VII thereof;

Fig. 8 shows a perspective view of an implement bar with the grooming member;

Fig. 9 shows a perspective view of a portion of an implement bar carrying a comb;

Fig. 10 shows a perspective view of the clamping member;

Fig. 11 shows a perspective view of the shield and knob member for the release catch;

Fig. 12 shows the bent spring release catch; and

Fig. 13 shows the compression spring.

As illustrated in the drawings, the pocket implement in accordance with the invention has the housing back portion 1 and housing front portion 2 held together by the clamping member 3. The latter is preferably U-shaped, having the legs 4 and 5 respectively and each leg carrying at their lower ends the hook portions 6. The front portion or leg 5 of the clamping member 3 defines an aperture 7. An implement bar or carrier member 8 is carried slidably in the implement housing and between the housing portions 1 and 2 which latter are preferably provided on their inner surfaces with the implement bar positioning or guide veins 9, 10 and 24, 24 respectively.

Implement bar 8 carries the grooming member or implement such as a brush defined for

2 instance by the bristles 11. Bar member 8 also carries the cut-out or slotted portion 12 and a catch member such as the projection or knob 13. As illustrated in Fig. 9, any other suitable grooming implement may be carried such as the comb member 14 carried by the bar member 8a.

Referring to Figs. 4 and 5, the back portion 1 of the housing is provided with the central ribs or veins 15 carrying the cross member 16. The veins 15 are of about the same type as the veins 9, 10 and also serve to guide the bar 8 in its sliding arrangement within the housing between the housing portions 1 and 2. The guide veins 15 furthermore define with the cross portion 16 and the top part 17 of the housing the aperture or wide slot 18. A relatively narrow slot 19 is defined by the adjacent portions of the guide veins 15, the cross member 16 and the lower portion 20 of the housing. The bridging member 20 carries the semicircular depression 21 which is positioned and dimensioned to act as a stop for the projection or knob 13 of the bar member 8. Cross or bridging member 16 is sufficiently recessed with its surface relative the thereto adjacent guide veins 15 that the projection or knob 13 may pass the same in the travel of the bar member 8 up and down within the housing of the implement in accordance with the invention. Housing portion 1 is further preferably provided with the cut-out sections 22 and 23 at the top and bottom thereof respectively.

Specifically referring to Figs. 6 and 7, the front portion 2 of the housing is provided with guide veins or ribs 24 for properly positioning and guiding the bar member 8. The essentially flat back portion of housing section 2 defines between the guide veins or ribs 24 the slot 25, the bridging member 26 and below the latter the smaller slot 27. Housing section 2 further carries cut-out portions 28 and 29 at the top and bottom respectively and being substantially complementarily positioned with respect to the cut-outs 22 and 23 of housing portion 1. Housing sections 1 and 2 are preferably provided with the cooperating dowel arrangement composed of, for instance, the pins 30 in section 1 and the corresponding apertures 31 in section 2. These assure the proper fitting together of the housing sections 1 and 2 to form the housing within which the pocket implement is slidably arranged. Each of the housing sections 1 and 2 carry the side frame portions 32, 34 and 33, 35, respectively. The side frame portions 32, 33 on the top and sides of the respective housings are for each housing substantially uniform in height. The lower frame portions 34, 35 respectively are each positioned at the bottom of the corresponding frame portions 32, 33 of the respective housings. In this manner, when the housing portions 1 and 2 are fitted together, the lower frame portions 34, 35 define therebetween a slot within the housing of the implement through which the particular grooming member such as brush, comb or the like may extend. At the same time, these lower frame sections 34, 35 are sufficiently thick and the bar member 8 is preferably made sufficiently wide that the bar member when in the fully lowered position substantially rests with its length sides on the frame sections 34, 35 being thereby prevented from slipping or falling out of the housing.

The assembled construction and operation of the device in accordance with the invention is best seen with reference to Figs. 1, 2 and 3. As there illustrated, the bar member 8 carrying, for instance, the brush defined by the bristles 11 is slidably enclosed within the housing portions 1 and 2. A compression spring such as leaf spring 43 having the flattened end portions 44 is arranged in the upper portion of the housing between the top of the bar member 8 and the under surface of the top of housing sections 1 and 2. A bent spring 36 is provided having the upper right angled extension 38 carrying the projecting member 38a, the vertical section 36a and the relatively steeply upwardly angled portion 37. The downward section 36a defines an aperture 42. Spring 36 is arranged within the housing by anchoring the same to housing section 1 by way of the cross or bridging member 16. The spring 36 thus passes within the housing downwardly and around the bridge member 16 through the aperture 19 of housing section 1, and thence upwardly with its upwardly angled portion 37, the latter lying substantially flat against and being supported by the side portion 4 of the clamping member 3. The clamping member serves to hold the housing sections 1 and 2 together and fits over the housing sections and over the slots 18 and 25 of housing sections 1 and 2 respectively, fitting with its top portion and being securely held in position by the housing slots or cut-outs 22 and 28 respectively. The lower portions of the sides 4 and 5 of the clamping member 3 fit into the lower housing section cut-out portions 23 and 29 respectively to also hold these side portions in position, the hook members 6 clamping around the ends at the cut-outs. The clamping member 3 being substantially springy in nature and spring tension existing between the side portions 4 and 5 of clamping member 3, the latter snaps into position and firmly holds the sections together being prevented from slipping off by the hook 6. The upper substantially horizontally disposed portion 38 of spring member 36 is substantially in alignment with the cut-out or slotted portion 12 on top of the bar member so that when the bar member is in the raised position the extension 38 may fit into the slot so that the bar member may assume the highest position possible and thus be capable of securing the maximum compression of the spring 43. Aperture 42 defined in spring 36 is so positioned that the knob or projection 13 carried by bar member 8 registers with the aperture when bar member 8 is in the raised position, the projection and aperture cooperating to act as a catch to hold the bar member 8 in locked position against the force of the leaf spring 43 tending to depress or snap the bar member 8 downwardly.

A shield member 39 carrying the knob 40 is provided to fit into slot 25 of housing section 2 being anchored in said slot by way of the bent portion 41 fitting into slot 27 under cross or bridging member 26. Shield member 39 is held in position by and bears against the inner surface of the side portion 5 of clamping member 3. Knob portion 40 defined by shield member 39 is positioned to fit over the extension 38a of the horizontally disposed section 38 of spring 36.

In the practical operation of the device in accordance with the invention leaf spring 43 is loaded when pushing the bar member 8 upwardly as for instance by the simple expedient of pressing against the projecting grooming member as for instance defined by the bristles 11. Bar member 8 thus slides upwardly with the projection 13 along the upwardly directed section 36a of spring 36 thereby loading leaf spring 43 until the projection 13 snaps into cooperative position with the aperture 42. When it is then desired to use the implement, it is only necessary to press the button or knob portion 40 thereby engaging the extension 38a of section 38 of spring 36 and thereby pressing the downwardly directed section 36a of spring 36 into its slot 18 to free the projection 13. The spring will then cause the bar member 8 to move or snap downwardly to again project or extend the grooming member.

Within the preferred embodiment of the invention the upwardly extending substantially free spring arm 36a is yieldably engaged by the bar member 8 by way of the projection 13 throughout the major portion of the downward travel of the bar member 8 from the implement retracted towards the implement projected position. In this manner the implement carrying bar member is kept from undue sidewards motion within the sliding passage defined between the guide veins 9, 10, 15 of housing section 1, and 24 of housing section 2. At the same time, the depression 21 below slot 19 within housing section 1 acts as a snap stop in that the projecting knob 13 may be so constructed that it snaps at least partially into the depression below at least a portion of the curvature of the reverse bent spring 36 on the inside of the housing section 1. In this manner, a certain resistance is offered to any undesired upward movement of the implement when using the same and without necessity of maintaining the spring 43 under any appreciable load when the bar member is in the implement projected position relative to the slot defined between the lower housing sections 34 and 35 respectively. The curved portion of the spring 36 tending to hold the projection 13 in position relative to the depression 21 acts simultaneously as a camming surface so that pressure on the implement will cause the projection again to ride up on the spring arm 36a to finally assume for the bar member 8 the implement retracted position for instance illustrated in Fig. 3.

If desired, the clamping member 3 may be further secured and held in position other than by or in addition to the slotted portions 22, 23 and 28, 29 by fitting into slightly recessed portions on either side of the openings or slots 18, 19 and 25, 27 of sections 1 and 2. This is, for instance, illustrated in Figs. 4, 5, 6 and 7 in which such recessed portions are defined by the slightly raised ribs 45 and 46 of housing sections 1 and 2 respectively shown in Figs. 5 and 7 and indicated in dotted outline in Figs. 4 and 6.

As is thus apparent from the foregoing, the invention within the broadest aspects thereof essentially embraces a pocket grooming unit comprising a housing defining on one side thereof an implement slot, a carrier member having on one side thereof means defining a grooming implement, and being slidable within said housing substantially between an implement projected and an implement retracted position relative to said slot, spring means engaging said carrier member for movement towards said slot and loadable by the movement of said carrier away from said slot, a latch member anchored within said housing and spring pressed towards said carrier member at least when said implement is substantially in said retracted position, means cooperatively provided on said carrier member and said latch member for releasably snap locking said carrier member in implement retracted position, and means for moving said latch member away from said carrier member to effect snap lock release.

Within the preferred scope of the invention as exemplified by the embodiment illustrated in the drawings, the latch member is a substantially reverse bent leaf spring anchored within the housing and with one leg defining a free arm spring yieldably pressed against the carrying member at least when the same is substantially in implement retracted position and is preferably so pressed against said member throughout the major portion of the downward movement of the implement towards the projected position thereof. Within the still further preferred construction in accordance with the invention, the housing is preferably defined by two spaced apart opposing sections complementarily defining, by suitable means preferably integral with each section, the implement slot, the sliding or guiding passage for the implement carrying member, and the space to accommodate the compression spring for the projection of the implement carrier, while preferably one of the sections also carries, substantially integral therewith, positioning and anchoring means for the latch member leaf spring, while the other said section preferably also carries, substantially integral therewith, securing and positioning means for a release member defining a projection extending through the housing and actuable for latch lock release of the implement carrier to spring force the same into implement projected position.

The preferred construction in accordance with the invention utilizing the illustrated embodiment of a two sectional housing and reverse bent leaf spring has the advantage of simplicity of construction, minimum of parts, and ease in assembly. As will be seen, the housing sections as such are fundamentally derived in the preferred construction from a single basic blank, i. e., a blank defining on its one or inner side a back section, raised rim sections with one thereof of lesser height than the others (which will complementarily define the slot with the corresponding section of an opposing blank, when assembled), guide veins preferably substantially perpendicular to the lesser height rim section, a slotted opening defined by the back section preferably in substantially central position and preferably also substantially perpendicular to said lesser height rim section, said slot with opening being subdivided by a bridging portion of the back section into an upper larger and a lower smaller slot, the blank preferably providing in addition on one of its other or outer side, its lesser height rim section and the thereto opposing rim section, means substantially in registry with the slotted opening, securing a clamping member (to hold two complementary housing sections together and preferably to also form a cover for the slotted opening). There is only a relatively slight deviation from the basic blank for a preferred blank section which is to serve as the leaf spring anchoring section in that the same is preferably provided with additional guide veins on the inside of the section substantially at either length side of slotted opening to define a space into which the free arm of the leaf spring may be depressed by the projection of the carrying member in its up and down movement. The construction permitting the incorporation of maximum elements into the blank as an integral part thereof including also complementary blank positioning means (such as the dowel means herein illustrated) materially reduces the number of separate elements and permits the same to be obtained in a substantially single operation such as by molding, pressing, casting or the like, in accordance with well known methods, and utilizing such suitable and attractive materials as, for example, plastics.

Thus, as will be readily seen, the individual parts going into the assembly of the unit in accordance with the invention only comprise for instance two molded housing blanks, the reverse bent leaf spring, the shield element defining the spring actuating knob, the implement carrying bar member, compression leaf spring, and the clamping unit to hold the entire assembly together. Assembly is extremely simple, no special fastenings being required.

I claim:

1. A pocket grooming unit comprising a housing defining on one side thereof an implement slot and substantially composed of two opposing sections, means on each section integral therewith defining a sliding passage between said sections substantially terminating at said slot and of greater cross-section than said slot, a carrier member within said passage and having, facing said slot, means defining a grooming implement dimensioned to fit through said slot, said carrier member, implement and sliding passage being dimensioned for slidable movement of said carrier within said passage substantially between an implement projected and an implement retracted position relative to said slot, a compression spring positioned within said passage between said carrier and the portion of the housing substantially opposed to said slot bearing against said housing and said carrier member, a reverse bent leaf spring having an angled portion and a vertical section positioned within said housing with said angled portion in securing contact with said housing and said vertical section defining an arm spring positioned for contact with said carrier member at least when the same is in substantially said retracted position, means integral with one of said sections for anchoring and positioning said reverse bent spring, snap locking means co-operatively carried by said carrier member and said vertical section positioned for releasable locking engagement when said carrier member is substantially in said retracted position, snap lock release means accessible externally of said housing and including a bent end portion of said arm spring defined by said vertical section extending away from said angled portion, the other of said sections defining in registry with said end portion of said arm spring, a slotted opening subdivided by a bridging member integral with said section, into a larger and a smaller slot, said release means including a strip member having a hooked end portion and mounted in said slotted opening to bear against said end of said arm spring and extend with said hooked portion into said smaller slot thereby pivotally anchoring said strip member, and means covering at least a portion of said slotted opening to prevent said strip member from moving appreciably away from said end portion of said arm spring.

2. A pocket grooming unit in accordance with claim 1 in which said section carrying said anchoring means defines a second slotted opening substantially parallel to said passage and subdivided by a bridging member, integral with said section, into an upper larger and a lower smaller slot, in which said reverse bent leaf spring is secured to said section by extending at the reverse bend through said smaller slot with said vertical section passing upwardly inside said bridging member and said angled portion, upwardly outside said bridging member, and in which means are provided covering at least a portion of said second slotted opening in anchoring support of said angled portion.

3. A pocket grooming unit in accordance with claim 2 in which said vertical section of said spring is mounted to extend for spring yieldable pressure against said carrier member at least for the major portion of the latter's downward movement from said retracted position.

4. A pocket grooming unit in accordance with claim 3 in which an aperture is defined by said vertical section, in which a projection is carried on said carrier member, in which said vertical section is mounted for spring yieldable pressure against said projection on its said downward movement, said aperture being adapted to receive said projection in said retracted position.

5. A pocket grooming unit in accordance with claim 4 in which said projection is mounted on said carrier member to be below the reverse bend of said spring when said carrier member is in the projected position to substantially act as a catch for said position.

6. A pocket grooming unit in accordance with claim 3 in which th eother of said sections defines a first subdivided slotted opening substantially congruent with said second mentioned slotted opening.

7. A pocket grooming unit in accordance with claim 6 in which both said covering means are defined by a single unit forming a clamping member for maintaining said housing sections in assembled position.

8. A pocket grooming unit in accordance with claim 7 in which the said compression spring consists of a substantially convexly bent leaf spring of the compression type with two free spring ends slidably engaging said carrier member with its free spring ends and compressible between said carrier member and said housing when said carrier member is moved towards said implement retracted position.

9. A pocket grooming unit in accordance with claim 8 in which an aperture is defined by said vertical section and in which a projecting is carried on said carrier member, and is mounted thereon to be below the reverse bend of said reverse bent spring when said carrier member is in the projected position to substantially act as a catch for said position, and in which said reverse bent spring is mounted for spring yieldable pressure against said projection on its said downward movement, said aperture being adapted to receive said projection in said retracted position.

CHARLES NEHRKE.

References Cited in the file of this patent

UNITED STATES PATENTS

| Number | Name | Date |
|---|---|---|
| 380,080 | Bouton et al. | Mar. 27, 1888 |
| 812,766 | McKenzie | Feb. 13, 1906 |

FOREIGN PATENTS

| Number | Country | Date |
|---|---|---|
| 506,644 | France | Oct. 26, 1920 |
| 604,700 | Germany | May 10, 1933 |
| 606,631 | Great Britain | Aug. 17, 1948 |